Patented Nov. 20, 1923.

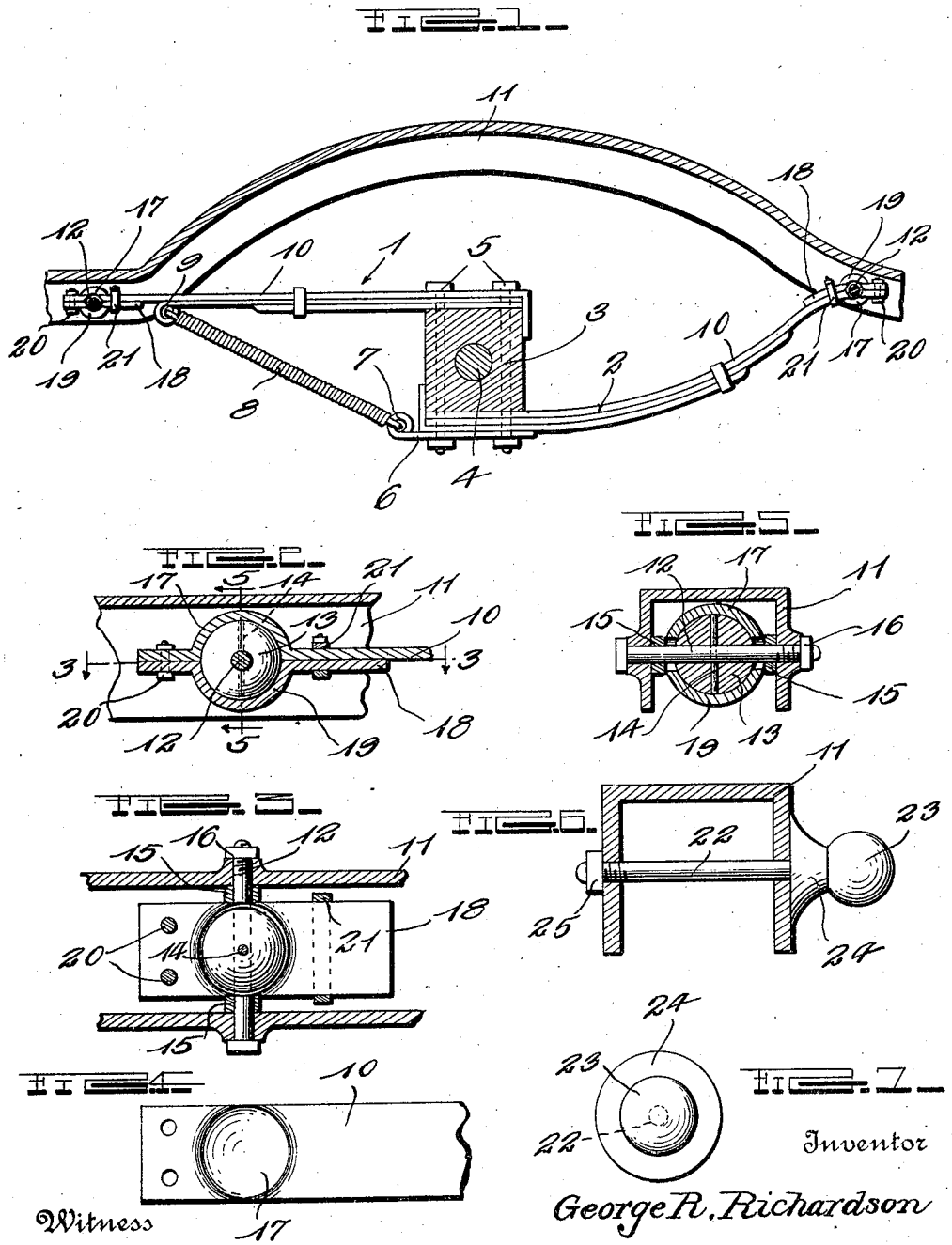

1,474,688

UNITED STATES PATENT OFFICE.

GEORGE R. RICHARDSON, OF GREENE, NORTH DAKOTA.

VEHICLE SPRING.

Application filed January 12, 1922, Serial No. 528,768. Renewed May 31, 1923.

*To all whom it may concern:*

Be it known that I, GEORGE R. RICHARDSON, a citizen of the United States, residing at Greene, in the county of Renville and State of North Dakota, have invented certain new and useful Improvements in Vehicle Springs; and I do declare the following to be a full, clear, and exact description of the invention, such as will enable others skilled in the art to which it appertains to make and use the same.

This invention relates to an improved vehicle spring and one object of the invention is to provide improved means for connecting the spring with the side bar of a vehicle chassis or frame, the means for connecting the spring with the chassis being such that the spring will be permitted of universal movement and thus permitted to have proper movement without being bent out of shape or caused to work loose.

Another object of the invention is to so construct the spring that a ball or spherical element carried by a pin of the vehicle frame may fit into a socket formed in the master leaf of the spring and held in this socket by means of a cap having connection with the end portion of the master leaf and provided with a socket positioned opposite the socket of the spring and receiving the ball.

Another object of the invention is to provide a structure of the character described in which the cap may be securely but releasably held in engagement with the master leaf of the spring and brought into proper engagement with the bearing ball so that the spring may have the desired amount of movement but at the same time be prevented from moving too freely.

Another object of the invention is to so construct this structure that the sockets of the spring and cap into which the bearing ball fits may be formed by stamping and pressing the spring and cap to form the desired bearing.

This invention is illustrated in the accompanying drawing, wherein:

Figure 1 is a view partially in section and partially in elevation and showing a spring construction having connection with the side bar of a vehicle chassis by means of the improved construction.

Figure 2 is an enlarged longitudinal sectional view through the outer end portion of a spring and the portion of the chassis side bar with which the spring is connected.

Figure 3 is a longitudinal sectional view taken along the line 3—3 of Fig. 2.

Figure 4 is a top plan view of the outer end portion of the spring.

Figure 5 is a transverse sectional view taken along the line 5—5 of Fig. 2.

Figure 6 is a view similar to Fig. 5 showing a modified construction.

Figure 7 is a partial end view of the form shown in Figure 6.

The improved construction whereby a spring may be connected with the side bar of a vehicle chassis has been shown in connection with a spring of the type disclosed in my co-pending application having Serial No. 491,253, filed August 10, 1921. The springs which are indicated in general by the numerals 1 and 2 extend from the block 3 of the axle 4 and are secured in place by bolts 5 which further serve to retain in place the plate 6. This plate 6 is provided at one end with an eye 7 for engagement with a spring 8 which is connected at its upper end with an eye 9 formed upon one of the leaves of the spring 1. Each of the springs is provided with a master leaf 10, the outer end of which is to be connected with the side bar 11 of the chassis by means of the improved joint construction which will now be described.

A bolt or pin 12 is carried by the side bar 11 of the chassis and carries a ball 13 which in the form shown in Figs. 1 through 6 is placed upon this bolt 12 between the depending side flanges of the side rail 11 and will be held against movement thereon by a pin or other similar fastener 14. Spacing washers 15 are provided upon this bolt between the ball and the side flanges of the side rail thus permitting of free rotary movement when the securing nut 16 of the bolt is put in place. The outer end portion of the master leaf 10 extends between the side flanges of the side bar 11 and is stamped and pressed to provide a cup or socket 17 which receives the bearing ball 13. A cap plate which is also stamped and pressed to provide a cup or pocket 19 for receiving ball bearing 13 fits against the outer end portion of the master leaf and is secured by means of bolts 20 at its outer end and a clamp 21 which extends about the master leaf and about the inner end portion of this cap. The cap will thus be securely held in place upon the outer end portion of the master leaf and since the bearing ball is positioned between the cups or sockets 17 and 19, the outer end portion of the spring will be securely held in place. From an inspection of Figs. 2 and 5, it will be readily seen that this construction forms a bearing which permits the spring to have universal movement thus preventing twisting and breaking of the spring.

In Figs. 6 and 7 there has been shown a slightly modified construction in which the bolt 22 which corresponds to the bolt 12 passes through the side flanges of the side rail 11 and is provided at one end with a spherical head 23 which takes the place of the bearing ball 13. An enlarged spacing element 24 is provided between the spherical head 23 and the depending side flange of the side bar 11 so that when the securing nut 25 which corresponds to the securing nut 16 is tightened, this ball or spherical head 23 will be spaced from the side bar. It will be readily seen that with either construction, the outer end portion of the spring will be mounted by a joint permitting of universal movement and that therefore the spring will not be twisted out of position or bent out of shape. When it is desired to disconnect the spring from the side bar of the automobile chassis, it is simply necessary to release the clamps 21 and bolts 20 and the outer end portions of the springs will be released and easy removal permitted.

I claim:

1. In a structure for connecting a spring member with a frame member having spaced side flanges, a master leaf for the spring member having its outer end portion provided with a socket, a stem carried by and extending between the flanges of the frame member, a bearing ball carried by said stem and fitting into said socket, and a cap connected with the outer end portion of the master leaf and having a socket receiving the bearing ball whereby the spring will have its outer end mounted for universal movement.

2. The structure of claim 1 having the cap and outer end portion of the master leaf extending between the side flanges of the frame member, the stem being passed through the flanges and the bearing ball carried by the stem between the flanges.

3. The structure of claim 1 having the stem passed through the flanges and the bearing ball carried by one end of the stem to one side of the frame member and forming a head for the stem.

In testimony whereof I have hereunto set my hand.

GEORGE R. RICHARDSON.